(12) United States Patent
Hanamoto

(10) Patent No.: US 10,597,243 B2
(45) Date of Patent: Mar. 24, 2020

(54) LOCKING MECHANISM FOR MOVABLE UNIT, AND SHEET FEEDING DEVICE AND IMAGE FORMING APPARATUS PROVIDED THEREWITH

(71) Applicant: KYOCERA Document Solutions Inc., Osaka (JP)

(72) Inventor: Katsuhiko Hanamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/049,254

(22) Filed: Jul. 30, 2018

(65) Prior Publication Data

US 2019/0062080 A1 Feb. 28, 2019

(30) Foreign Application Priority Data

Aug. 28, 2017 (JP) ................................. 2017-163381

(51) Int. Cl.
*B65H 1/26* (2006.01)
*H04N 1/00* (2006.01)
(Continued)

(52) U.S. Cl.
CPC .............. *B65H 1/266* (2013.01); *B65H 5/062* (2013.01); *G03G 15/00* (2013.01);
(Continued)

(58) Field of Classification Search
CPC .......... B65H 2402/64; B65H 2402/441; B65H 2402/45; B65H 2402/5155;
(Continued)

(56) References Cited

U.S. PATENT DOCUMENTS 7,684,731 B2 * 3/2010 Hirose ...................... B65H 5/00
399/124
8,634,745 B2 * 1/2014 Tomatsu ............ G03G 21/1633
399/110
9,329,565 B2 * 5/2016 Osaki ..................... B65H 43/00

FOREIGN PATENT DOCUMENTS

JP 5-261994 A 10/1993
JP 2003-048633 A 2/2003
JP 2006-206319 A 8/2006

OTHER PUBLICATIONS

Chinese Office Action from the Chinese Patent Office dated Nov. 1, 2019, issued to Chinese Application No. 201810921911.6.

* cited by examiner

*Primary Examiner* — Jeremy R Severson
(74) *Attorney, Agent, or Firm* — Stein IP, LLC

(57) ABSTRACT

A locking mechanism includes a hook, an engaged portion, and a biasing member, and locks a movable unit supported on a unit main body to the unit main body. The hook has a supporting portion pivotably supported on the unit main body and an engaging portion protruding from the supporting portion. The engaged portion is formed on the movable unit and is engageable with the engaging portion. A biasing member biases the hook in such a direction as to let the engaging and engaged portions engage. The hook has a first face facing the engaged portion at the tip end of the engaging portion and a second face extending from the first face toward the supporting portion and inclined relative to the first face in such a direction as to recede from the pivot. With the engaging and engaged portion in engagement, the engaged portion touches only the second face.

10 Claims, 8 Drawing Sheets

(51) Int. Cl.
*G03G 15/00* (2006.01)
*G03G 21/16* (2006.01)
*B65H 5/06* (2006.01)
*H04N 1/12* (2006.01)

(52) U.S. Cl.
CPC ......... *G03G 15/6502* (2013.01); *G03G 21/16* (2013.01); *G03G 21/1647* (2013.01); *H04N 1/00* (2013.01); *H04N 1/00519* (2013.01); *H04N 1/00538* (2013.01); *H04N 1/00557* (2013.01); *H04N 1/121* (2013.01); *B65H 2402/441* (2013.01); *B65H 2402/45* (2013.01); *B65H 2402/5155* (2013.01); *B65H 2402/64* (2013.01); *B65H 2404/144* (2013.01); *B65H 2404/6111* (2013.01); *B65H 2405/121* (2013.01); *B65H 2801/06* (2013.01); *B65H 2801/39* (2013.01); *G03G 2215/00713* (2013.01); *G03G 2221/1654* (2013.01)

(58) Field of Classification Search
CPC ......... B65H 2405/121; G03G 21/1628; G03G 21/1633; G03G 2221/1654; G03G 2215/00713
See application file for complete search history.

LOCKING MECHANISM FOR MOVABLE UNIT, AND SHEET FEEDING DEVICE AND IMAGE FORMING APPARATUS PROVIDED THEREWITH

This application is based upon and claims the benefit of priority from the corresponding Japanese Patent Application No. 2017-163381 filed on Aug. 28, 2017, the entire contents of which are incorporated herein by reference.

BACKGROUND OF THE INVENTION

The present disclosure relates to a locking mechanism for movable units incorporated in image forming apparatuses such as electrophotographic copiers and laser printers, and relates also to sheet feeding devices and image forming apparatuses incorporating such a locking mechanism.

Conventionally, images forming apparatuses such as electrophotographic copiers and laser printers are provided with replaceable units that are removable from the image forming apparatuses main body, such as a drum unit which incorporates a photosensitive drum, a charging device, and a cleaning device, a developing unit which supplies toner to a photosensitive drum and develops an electrostatic latent image to form a toner image, and a toner cartridge which feeds toner to a developing unit. In these structures, a locking mechanism is provided so that the replaceable units do not disengage from the image forming apparatus main body except when necessary.

Other than for replaceable units, a locking mechanism is provided also for movable members that are pivotally provided relative to the image forming apparatus main body, such as a conveying unit, an exterior cover, or the like, so that the movable members do not pivot except when necessary.

For example, there is known a sheet feeding apparatus provided with a sheet feed tray and an apparatus main body. The sheet feed tray includes a lever which is integrally fitted to the sheet feed tray and which is operated substantially in the horizontal direction to permit the sheet feed tray to be inserted and extracted, and a hook which is engaged with the lever and can pivot as the lever is operated. The apparatus main body includes a first biasing member which applies pressure in such a direction as to push the sheet feed tray out of the apparatus main body, a positioning member which engages with the hook to position the sheet feed tray relative to the apparatus main body, and a second biasing member which biases so as to apply pressure to the positioning member against the hook.

For another example, there is also known a sheet conveying device, where an upper guide that serves also as an exterior portion is coupled by a coupling member which is an elastic member provided on the lower guide fixed integrally to the frame of the apparatus main body. When the hook at an access portion is fixed by being locked on a stopper on the apparatus main body, if the horizontal moving range of the upper guide is equal to or larger than the gap between the access portion and the apparatus main body, elasticity of the coupling member helps fill the gap.

SUMMARY OF THE INVENTION

A locking mechanism according to one aspect of the present disclosure locks to a unit main body a movable unit movably supported relative to the unit main body. The locking mechanism includes a hook, an engaged portion, and a biasing member. The hook has a supporting portion pivotably supported on a pivot on the unit main body and an engaging portion protruding from the supporting portion, and is substantially L-shaped. The engaged portion is formed on the movable unit and is engageable with the engaging portion. The biasing member biases the hook in such a direction as to let the engaging and engaged portions engage. The hook has a first face facing the engaged portion at the tip end of the engaging portion and a second face extending from the first face toward the supporting portion and inclined relative to the first face in such a direction as to recede from the pivot. With the engaging and the engaged portion in engagement, the engaged portion touches only the second face.

Further features and advantages of the present disclosure will become apparent from the description of the embodiments given below.

DETAILED DESCRIPTION

Figure 1:
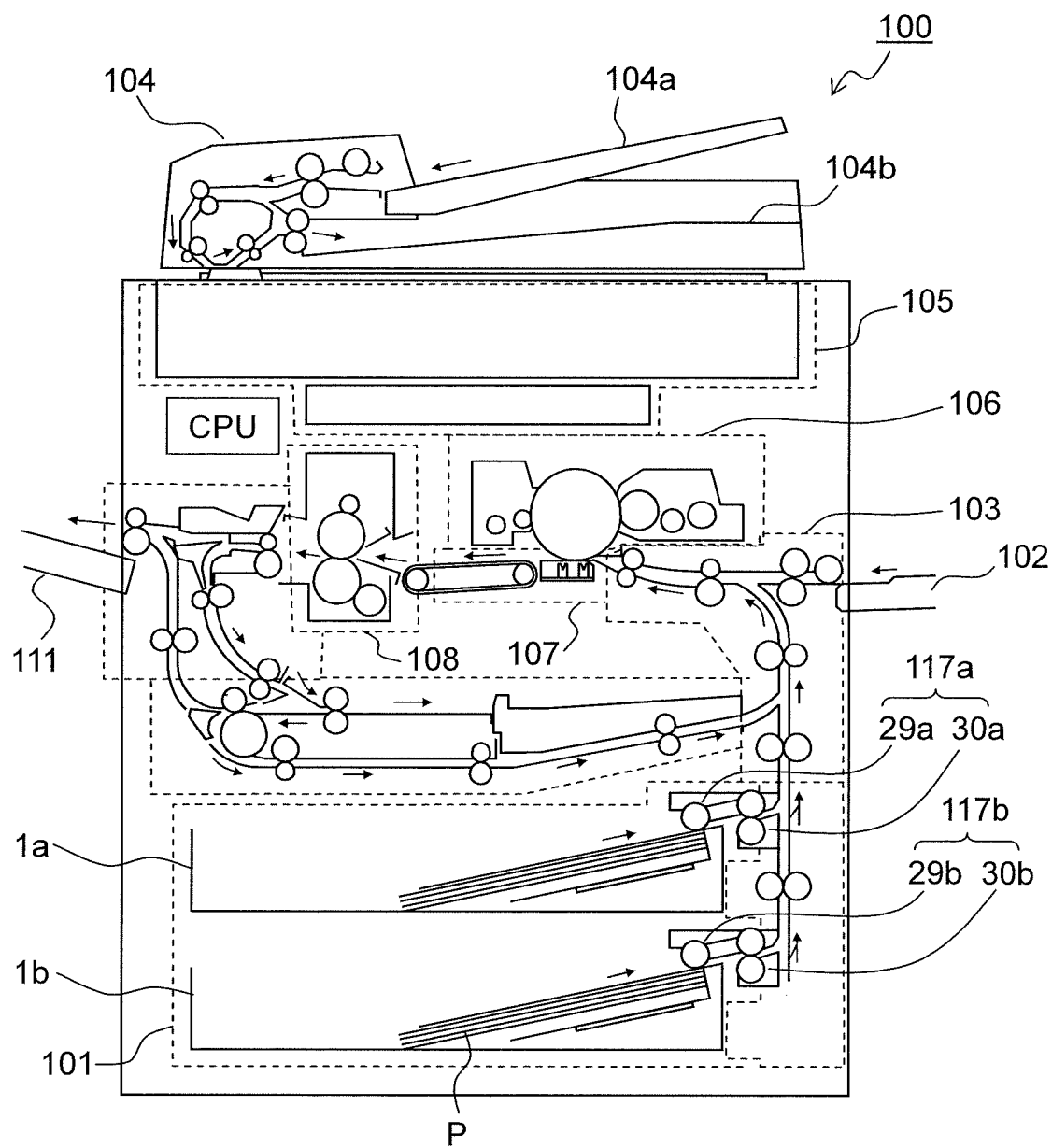
FIG. 1 is a side sectional view showing an internal structure of an image forming apparatus provided with a locking mechanism according to the present disclosure.

Hereinafter, with reference to the accompanying drawings, embodiments of the present disclosure will be described in detail. FIG. 1 is a side sectional view showing the internal structure of an image forming apparatus 100 provided with a locking mechanism according to the present disclosure. The solid-line arrows in the diagram indicate the conveying paths and the conveying directions of sheets P.

In FIG. 1, arranged in a lower part of the image forming apparatus 100 is a cassette-type sheet feed portion 101. In the cassette-type sheet feed portion 101, two sheet feed cassettes 1a and 1b are provided. Inside the sheet feed cassettes 1a and 1b, a stack of sheets P such as unprinted cut paper is stored, and sheet feed units 117a and 117b provided in the main body of the image forming apparatus 100 feed out one sheet after another separately from the stack of sheets P. The sheet feed unit 117a has a pick-up roller 29a and a sheet feed roller pair 30 provided for the sheet feed cassette 1a. The sheet feed unit 117b has a pick-up roller 29b and a sheet feed roller pair 30b provided for the sheet feed cassette 1b.

A manual sheet feed portion 102 is provided outside an upper part of the right side face of the image forming apparatus 100. Placed on the manual paper feed portion 102 are sheets different in size or thickness from those in the cassette-type paper feed portion 101, or what is to be fed in one by one such as an OHP sheet, an envelope, a post card, an invoice, or the like.

Inside the image forming apparatus 100, a sheet conveying portion 103 is arranged. The sheet conveying portion 103 is located to the right, that is, on the downstream side in the sheet feed direction, of the cassette-type sheet feed portion 101, and is located to the left, that is, on the downstream side in the sheet feed direction, of the manual sheet feed portion 102. Sheets P fed out of the cassette-type sheet feed portion 101 are conveyed vertically upward along a side face of the main body of the image forming apparatus 100 by the sheet conveying portion 103, and sheets P fed out of the manual sheet feed portion 102 are conveyed horizontally.

On the top face of the image forming apparatus 100, a document conveying device 104 is arranged, and under this, an image reading portion 105 is arranged. When copying a document, a user places the document, comprising a plurality of sheets, on the document conveying device 104. The document conveying device 104 feeds out one sheet after another separately from the document, and the image reading portion 105 reads its image data.

On the downstream side of the sheet conveying portion 103 in the sheet conveying direction, under the image reading portion 105, an image forming portion 106 and a transfer portion 107 are arranged. At the image forming portion 106, based on the image data read by the image reading portion 105, an electrostatic latent image of the document image is formed. This electrostatic latent image is developed to form a toner image. On the other hand, in synchronism with the timing of the toner image formation at the image forming portion 106, a sheet P is conveyed from the cassette-type sheet feed portion 101 to the transfer portion 107 via the sheet conveying portion 103. The toner image formed at the image forming portion 106 is transferred to the sheet P at the transfer portion 107.

On the downstream side of the transfer portion 107, a fixing portion 108 is arranged. The sheet P to which the toner image has been transferred at the transfer portion 107 is conveyed to the fixing portion 108, and as the sheet P passes through a nip portion of a fixing roller pair comprising a heating roller and a pressure roller, the toner image on it is fixed to make a permanent image. The sheet P discharged from the fixing portion 108 is then discharged onto the sheet discharge tray provided outside the left side face of the image forming apparatus 100.

Figure 2:
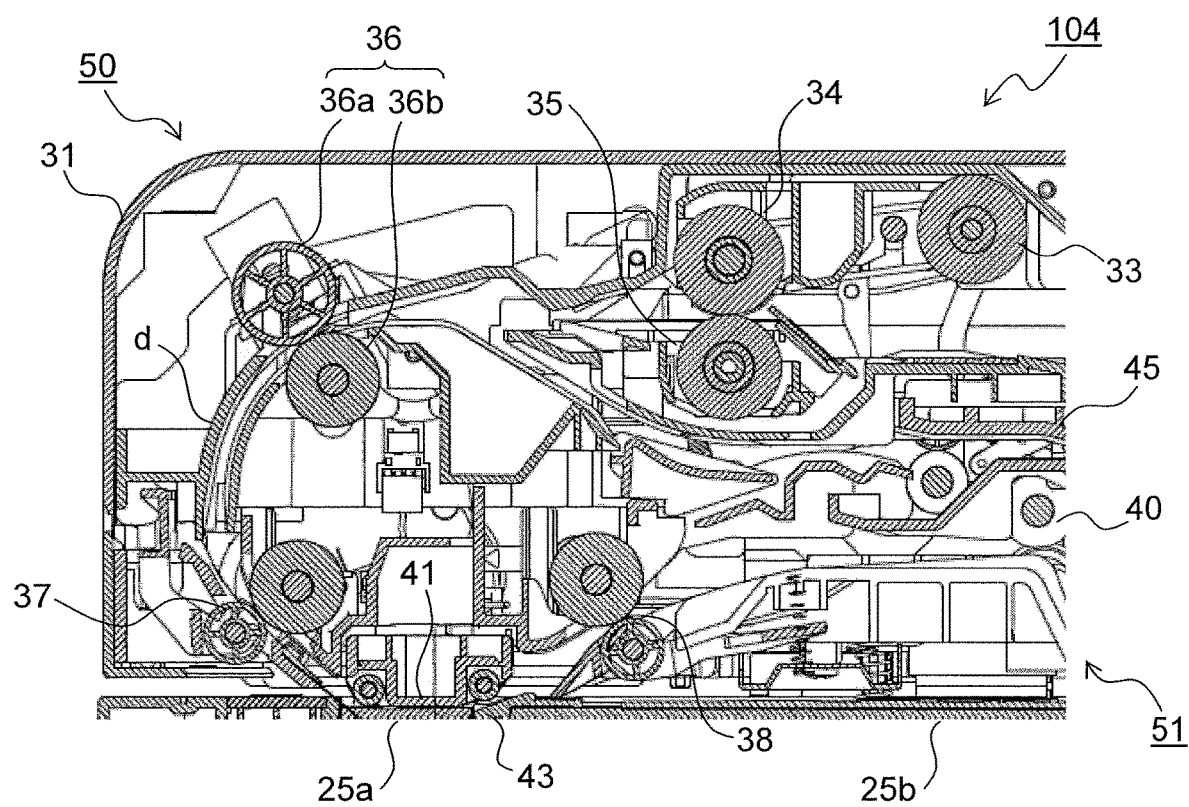
FIG. 2 is a partial sectional view showing an internal structure of a document conveying device.
Figure 3:
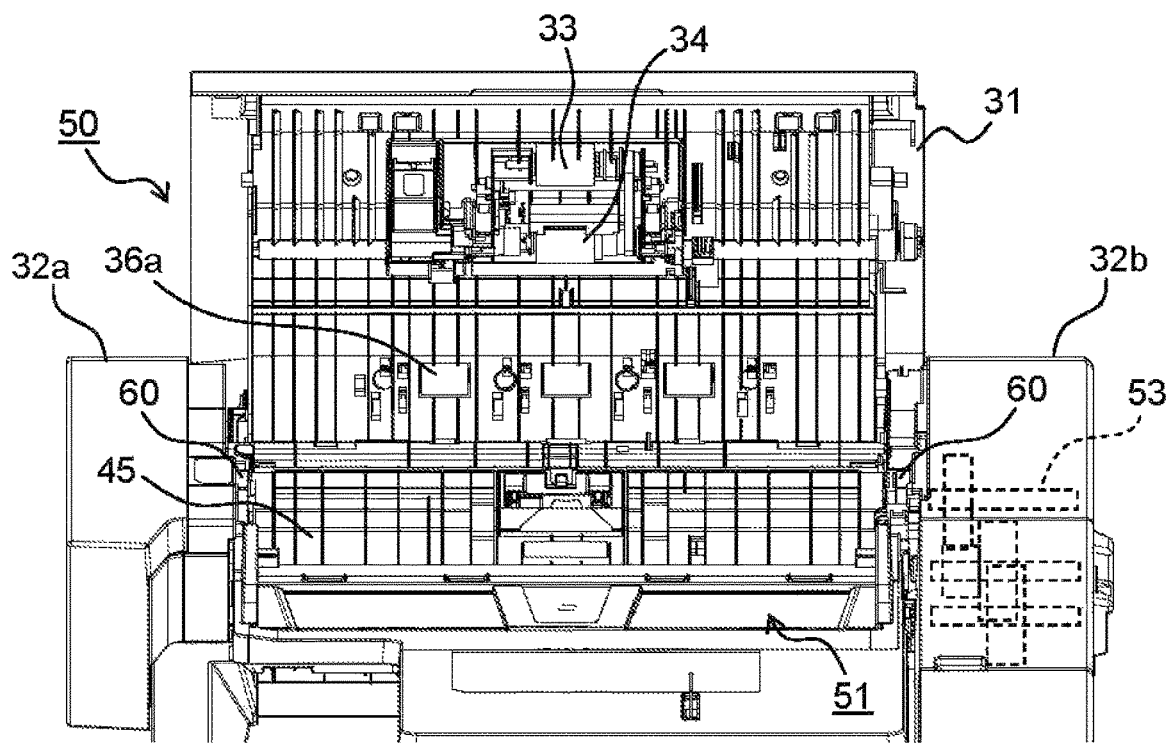
FIG. 3 is a side view of the document conveying device with an access cover opened, as seen from a sheet feed tray side (right side in FIG. 1).

Next, the structure of the document conveying device 104 mounted on the image forming apparatus 100 will be described in detail with reference to FIG. 2 and FIG. 3 in addition to FIG. 1. FIG. 2 is a partial sectional view showing the internal structure of the document conveying device 104, and FIG. 3 is a side view of the document conveying device 104 with its access cover 31 open, as seen from the sheet feed tray 104a side (right side in FIG. 1).

Arranged on the top face of the image reading portion 105 is a contact glass 25 comprising an automatic reading glass 25a and a manual placement document glass 25b. Arranged between the automatic reading glass 25a and the manual placement document glass 25b is a conveying guide 43 that scoops up the leading edge of the document conveyed by the document conveying device 104.

The access cover 31 of the document conveying device 104 is supported so as to be pivotable relative to a frame 45 of the document conveying device 104. Inside the document conveying device 104, a document conveying path d leading from a document sheet feed tray 104a to a document discharge tray 104b (see FIG. 1 for both) is formed. Inside the document conveying device 104, along the document conveying path d, there are provided document conveying members comprising a pick-up roller 33, a sheet feed roller 34 and a separation roller 35 (a separating and conveying portion), a registration roller pair 36, conveying roller pairs 37 and 38, a discharge roller pair 40, and the like. Across the access cover 31, on the front side of the document conveying device 104 (left side in FIG. 3), a front-side cover 32a is attached, and on the rear side (right side in FIG. 3), a rear-side cover 32b is attached.

On the access cover 31, the pick-up roller 33, the sheet feed roller 34, and one (the upper) roller 36a of the registration roller pair 36 are supported. In the access cover 31, a drive input gear (unillustrated) that feeds a rotation driving force to the sheet feed roller 34 is also arranged. Hereinafter, a unit including the access cover 31, the pick-up roller 33, the sheet feed roller 34, and the roller 36a will be referred to as a cover-side conveying portion 50. The cover-side conveying portion 50 constitutes one of conveying faces of the document conveying path d.

Supported on the frame 45 are the other (lower) roller 36b of the registration roller pair 36, the conveying roller pairs 37 and 38, and the discharge roller pair 40. In the frame 45, a driving portion 53 comprising motors, gears, and the like for transmitting a driving force to the cover-side conveying portion 50 is also arranged. The driving portion 53 is housed inside the rear-side cover 32b. Hereinafter, a unit including the frame 45, the roller 36b, the conveying roller pairs 37 and 38, the discharge roller pair 40, and the driving portion 53 will be referred to as a frame-side conveying portion 51. The frame-side conveying portion 51 constitutes the other of the conveying faces of the document conveying path d.

The document conveying path d is curved so as to be reversed while leading from the registration roller pair 36 to the automatic reading glass 25a. In the document conveying path d, there are provided, at adequate places, a sheet feed sensor to detect the presence or passage of a document, and a plurality of document detection sensors (unillustrated) including a discharge sensor. When a sheet jam occurs inside the document conveying path d, it is handled by opening the access cover 31 to expose the document conveying path d over a wide range.

As shown in FIG. 3, on both sides of the frame 45 in its width direction (the left-right direction in FIG. 3), a pair of hooks 60 to keep the access cover 31 closed is provided. The hook 60 constitutes, together with a stopper 61 and a tension spring 63 (see FIG. 4 for both), a locking mechanism 80, which will be described later.

Next, document conveying operation by a sheet-through method using the document conveying device 104 will be described. In the sheet-through method, a document comprising a plurality of sheets is set, with the image side up, on the document sheet feed tray 104*a*. Then, when a copy start button at an operating portion (unillustrated) of the image forming apparatus 100 is pressed, a lift mechanism (unillustrated) pushes the pick-up roller 33 down toward the document. The pick-up roller 33 and the sheet feed roller 34 are arranged in an unillustrated frame body of the access cover 31. As a result, the weight of the pick-up roller 33 acts on the document that is set on the document sheet feed tray 104*a*, and the pick-up roller 33 is pressed against the top face of the document with a predetermined pressure (sheet feed pressure).

The pick-up roller 33 is coupled to the sheet feed roller 34 by an unillustrated gear, and when the sheet feed roller 34 rotates with a driving force transmitted from the driving portion 53, the pick-up roller 33 is also driven to rotate.

From the document that is set on the document sheet feed tray 104*a*, generally a plurality of sheets at the top are fed to the nip portion between the sheet feed roller 34 and the separation roller 35 by the pick-up roller 33. Then, the separation roller 35 separates only the one topmost sheet from the document comprising a plurality of sheets to convey it toward the registration roller pair 36. Here, when the leading edge of the document is detected by the sheet feed sensor, the document is conveyed further by a predetermined distance, and then the driving portion 53 stops, so that the pick-up roller 33 and the sheet feed roller 34 stop being driven to rotate, primary sheet feeding thus being finished. The primarily fed document, while bending, stops with its leading edge facing the nip portion of the registration roller pair 36.

When a predetermined time has passed after the completion of primary sheet feeding, secondary sheet feeding is started. Specifically, the registration roller pair 36 is driven to rotate by a driving force transmitted from the driving portion 53. The document is conveyed toward the automatic reading glass 25*a* by the registration roller pair 36 and the conveying roller pair 37. The document conveyed to the automatic reading glass 25*a* touches a document holding member 41 arranged opposite the automatic reading glass 25*a*, and is pressed against the automatic reading glass 25*a* from above. The image on the obverse side (automatic reading glass 25*a* side) of the document is, through the automatic reading glass 25*a*, read by a reading module (unillustrated) provided inside the image reading portion 105.

Then, the document that has passed the automatic reading glass 25*a* is conveyed toward the conveying roller pair 38 via the conveying guide 43, and is finally discharged on the document discharge tray 104*b* by the discharge roller pair 40. At this time, the discharge sensor detects the passage of the trailing edge of the document, and thereby completion of image reading for one sheet of the document is detected.

Figure 4:
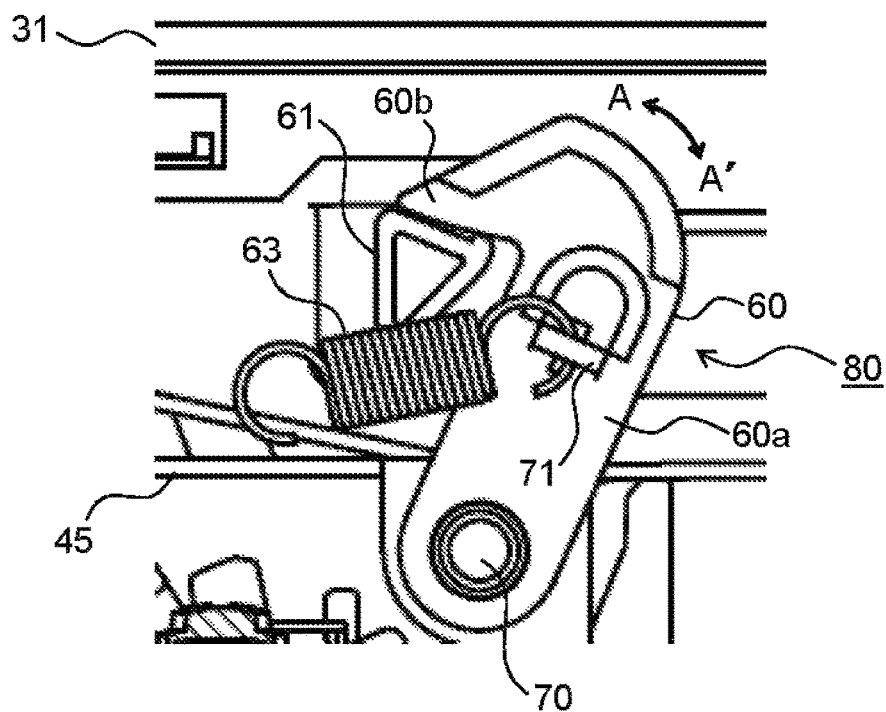
FIG. 4 is a side view of the locking mechanism according to one embodiment of the present disclosure.

FIG. 4 is a side view of the locking mechanism 80 according to a first embodiment of the present disclosure. FIG. 4 shows the locking mechanism 80 arranged on the front side (left side in FIG. 3) of the document conveying device 104. The locking mechanism 80 arranged on the rear side (right side in FIG. 3) of the document conveying device 104 has quite the same structure, so no overlapping description will be repeated.

The locking mechanism 80 includes the hook 60, the stopper 61, and the tension spring 63. The hook 60 is a substantially L-shaped member including a supporting portion 60*a*, which is supported on a pivot 70 formed on the frame 45 so as to be pivotable in the arrow AA' directions, and an engaging portion 60*b*, which protrudes from the supporting portion 60*a*. The stopper 61 is a projection in a triangular shape as seen in a plan view that is formed on the access cover 31, and engages with the engaging portion 60*b* as the hook 60 pivots in the arrow A direction. The tension spring 63 has its ends coupled to the spring locking portion 71 of the hook 60 and to the frame 45, and biases the hook 60 in the direction (arrow A direction, or a first direction) in which the hook 60 engages with the stopper 61.

Figure 5:
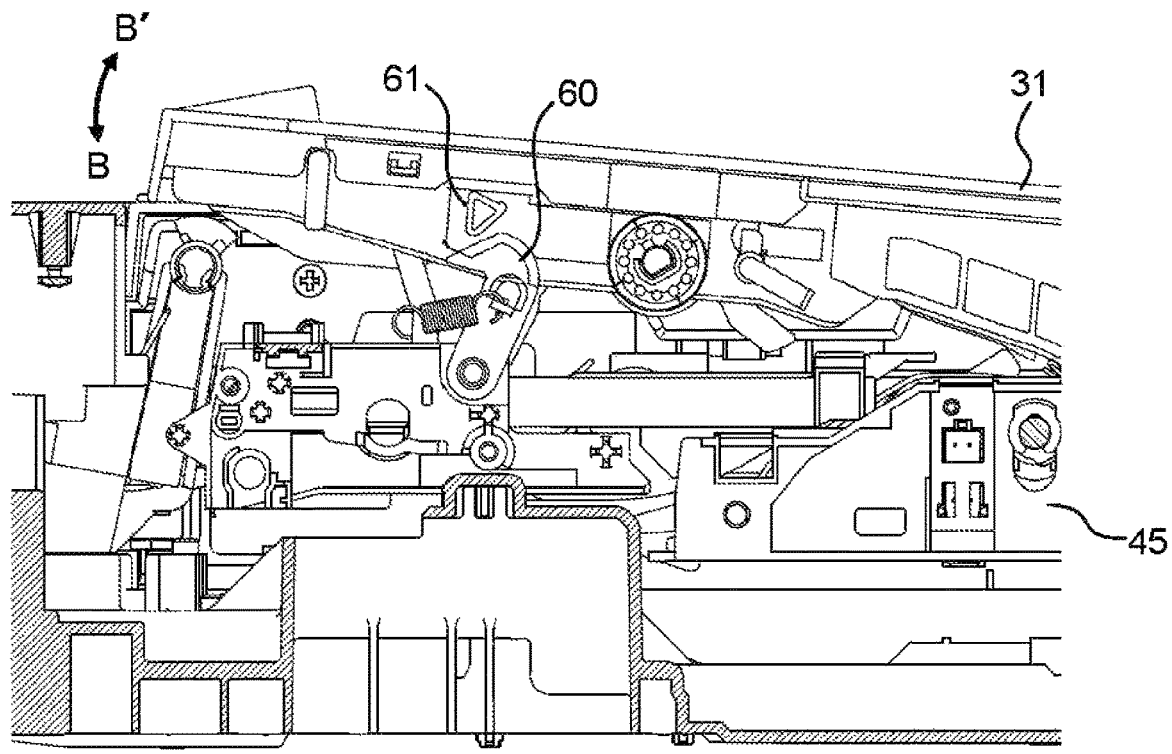
FIG. 5 is a side view of a front-side (left-side in FIG. 3) side face of the document conveying device provided with the locking mechanism, as seen from a rear side.
Figure 6:
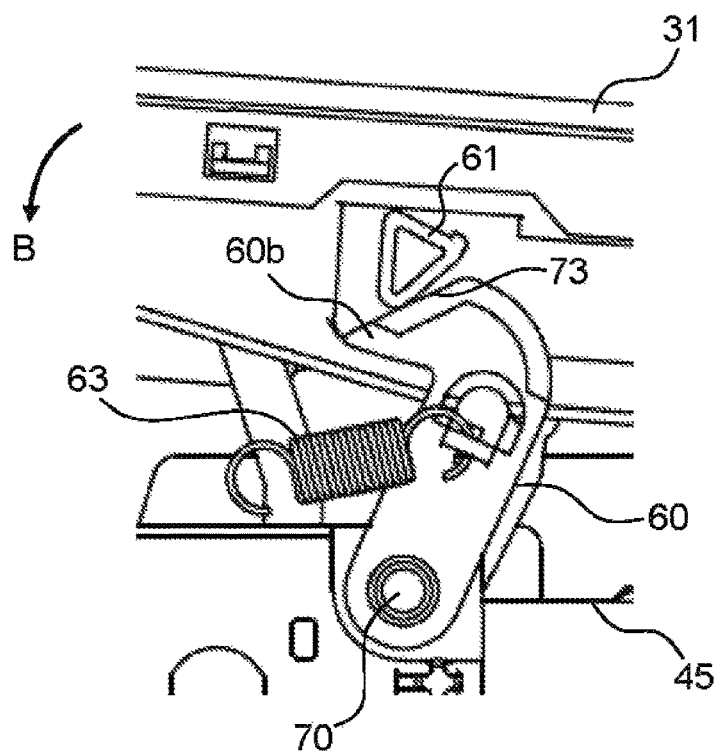
FIG. 6 is a side view of the locking mechanism, showing a state where a stopper touches a hook as the access cover pivots in a closing direction.
Figure 7:
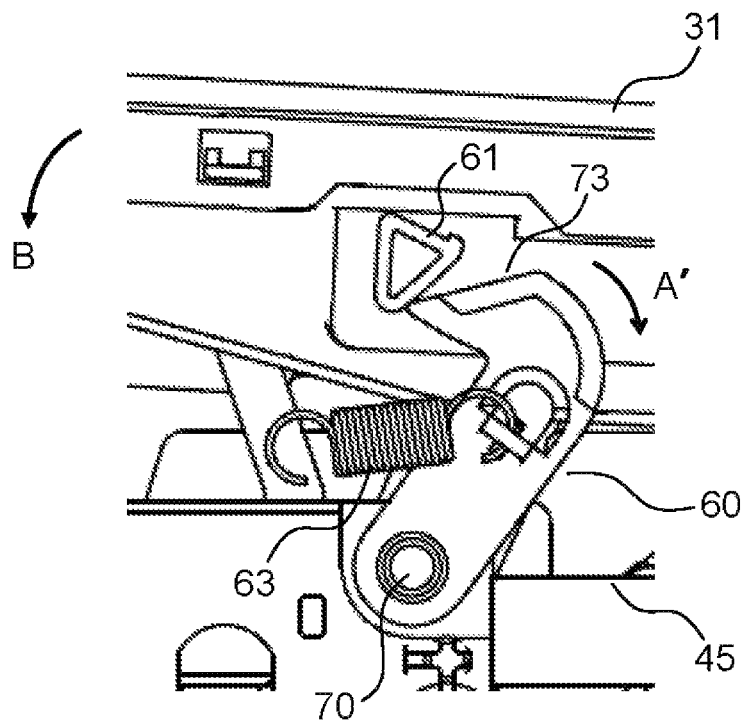
FIG. 7 is a diagram showing a state where the hook pivots in an arrow A' direction by being pressed by the stopper from the state in FIG. 6.
Figure 8:
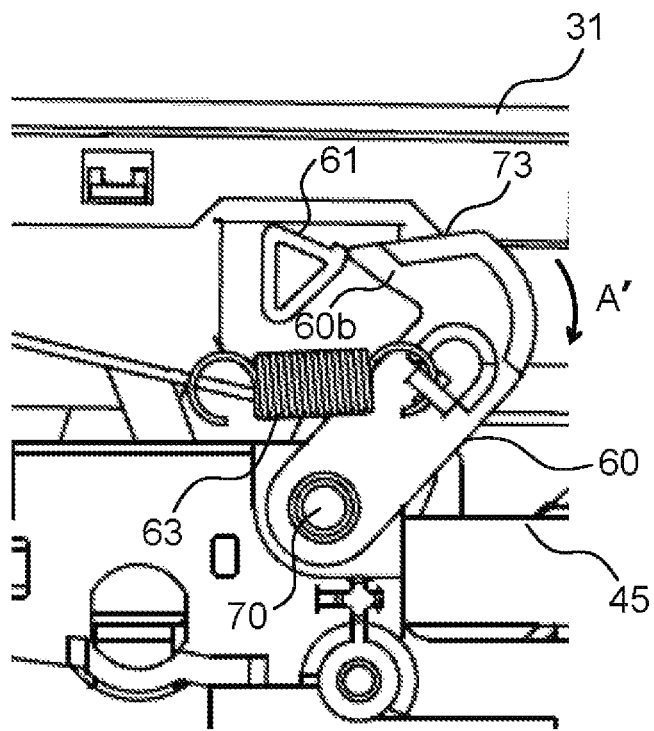
FIG. 8 is a diagram showing a state where the hook further pivots in the arrow A' direction from the state in FIG. 7, and a tip end of an engaging portion moves to an end part of the stopper.

FIG. 5 is a side view, as seen from the rear side, of the front-side (left-side in FIG. 3) side face of the document conveying device 104 provided with the locking mechanism 80. FIG. 6 to FIG. 8 are side views showing the operation of the hook 60 that accompanies the pivoting of the access cover 31 in the closing direction. The operation of the locking mechanism 80 will now be described with reference to FIG. 4 to FIG. 8.

From the state in FIG. 3, pivoting the access cover 31 in the closing direction (arrow B direction) causes, as shown in FIG. 5, the stopper 61 to approach the hook 60 from above. Then, as shown in FIG. 6, a lower end part of the stopper 61 touches an inclined portion 73 at the upper end of the hook 60. From the state in FIG. 6, pivoting the access cover 31 further in the closing direction causes, as shown in FIG. 7, the stopper 61 to move downward while pressing the inclined portion 73. With this, the hook 60, while expanding the tension spring 63, pivots in the arrow A' direction (a second direction). Then, as shown in FIG. 8, the hook 60 pivots until the tip end of the engaging portion 60*b* reaches the apex of the stopper 61.

From the state in FIG. 8, when the tip end of the engaging portion 60*b* slides over the apex of the stopper 61, by the biasing force (restoring force) of the tension spring 63 that has been expanded, the hook 60 pivots in the arrow A direction, and as shown in the FIG. 4, the engaging portion 60*b* engages with the stopper 61 so that the access cover 31 is kept closed.

On the other hand, the access cover 31 is opened in the following manner: lifting up the pivot end of the access cover 31 (in the arrow B' direction in FIG. 5) causes the stopper 61 to push up the engaging portion 60*b* from the state in FIG. 4. Thus the hook 60, while expanding the tension spring 63, pivots about the pivot 70 in the arrow A' direction. When the tip end of the engaging portion 60*b* slides over the apex of the stopper 61, by the biasing force of the tension spring 63, the hook 60 pivots in the arrow A direction, and the engaging portion 60*b* and the stopper 61 disengage from each other. Then, the access cover 31 is opened further until it reaches the state in FIG. 3.

Figure 9:
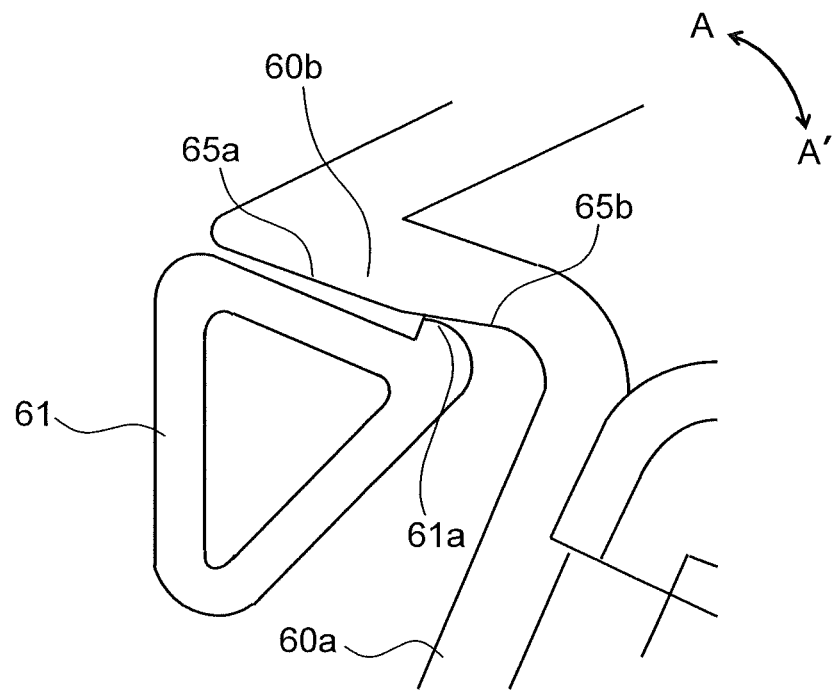
FIG. 9 is a partly enlarged view of and around the engaging portion and the stopper in FIG. 4.

FIG. 9 is a partly enlarged view of and around the engaging portion 60*b* and the stopper 61 in FIG. 4. On the engaging portion 60*b* of the hook 60, opposite the stopper 61, a first face 65*a* and a second face 65*b* are formed in order from the tip end side of the engaging portion 60*b*. The second face 65*b* is inclined, relative to the first face 65*a*, in such a direction (upward in FIG. 9) as to recede from the pivot 70. On the top face of the stopper 61, at an end part closer to the pivot 70 (the right side in FIG. 9), an elevated portion 61*a* is formed. The first face 65*a* of the engaging part 60*b* is not in contact with the stopper 61, and only the elevated portion 61*a* of the stopper 61 touches the second face 65*b*.

Figure 10:
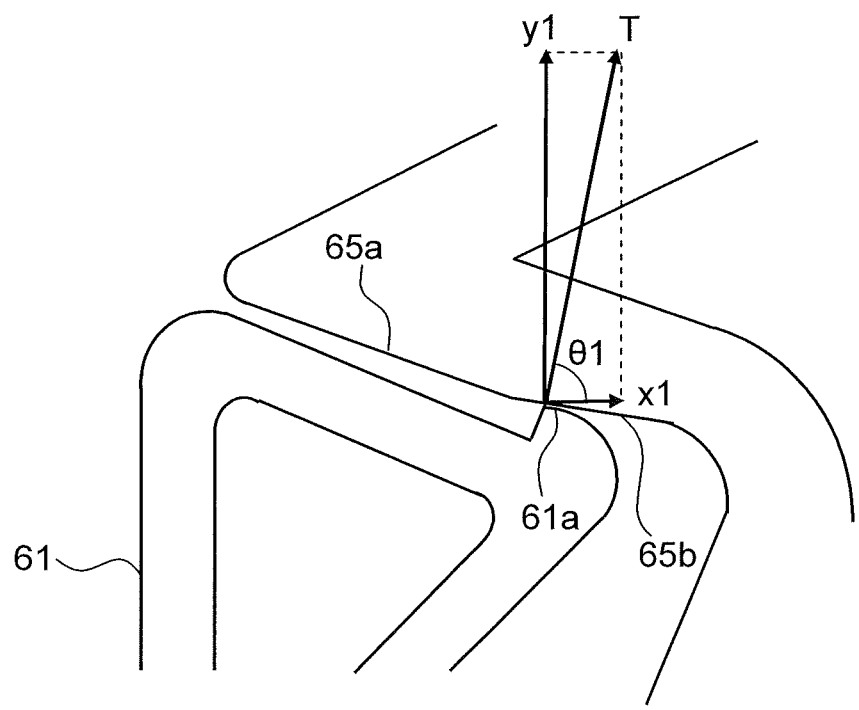
FIG. 10 is a diagram showing a load that acts on the hook from the stopper in the locking mechanism according to this embodiment.

FIG. 10 is a diagram showing the load that acts on the hook 60 from the stopper 61 in the locking mechanism 80 according to this embodiment. Of the hook 60, only the second face 65*b* of the engaging portion 60*b* is in contact with the elevated portion 61*a* of the stopper 61, so the load (reaction force) acting on the hook 60 from the stopper 61 is represented by a vector T[N] that starts at the elevated portion 61a and is perpendicular to the second face 65b.

The load T can be decomposed into a horizontal component force x1 and a vertical component force y1. Let the angle of the vector T relative to the horizontal direction be θ1, then the component forces x1 and y1 are given by x1=T×cos θ1[N] and y1=T×sin θ1[N], respectively. For example, if the angle θ1 is 77.2°, the component force x1=T×cos 77.2°≈0.22T[N]. Likewise, the component force y1=T×sin 77.2°≈0.98T[N].

Figure 11:
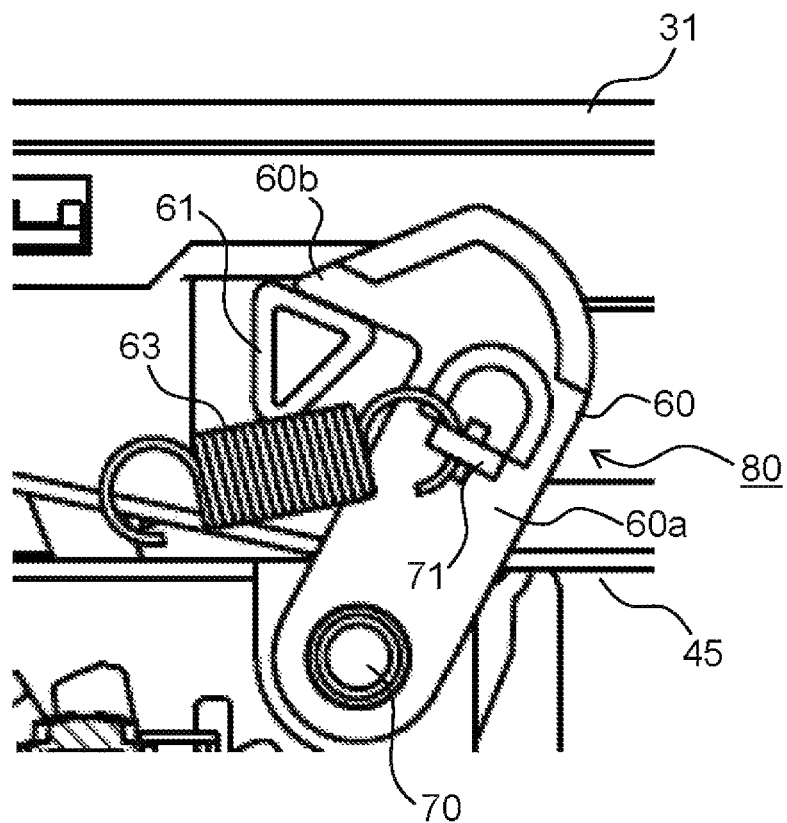
FIG. 11 is a side view of a conventional locking mechanism.
Figure 12:
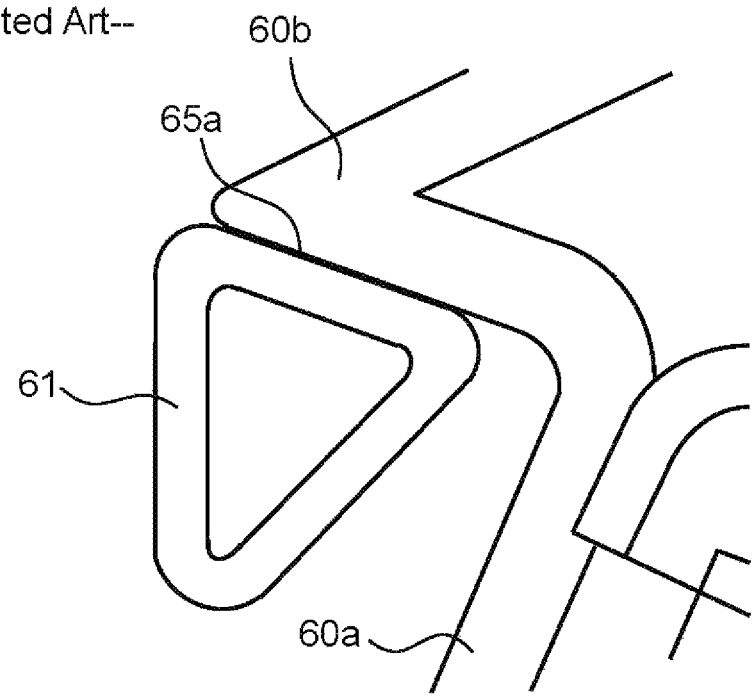
FIG. 12 is a partly enlarged view of and around an engaging portion and a stopper in FIG. 11.

FIG. 11 is a side view of a conventional locking mechanism 80, and FIG. 12 is a partly enlarged view of and around the engaging portion 60b and the stopper 61 in FIG. 11. In the conventional locking mechanism 80, as shown in the FIG. 11 and FIG. 12, the engaging portion 60b has only the first face 65a, and the first face 65a and the top face of the stopper 61 make surface contact with each other.

Figure 13:
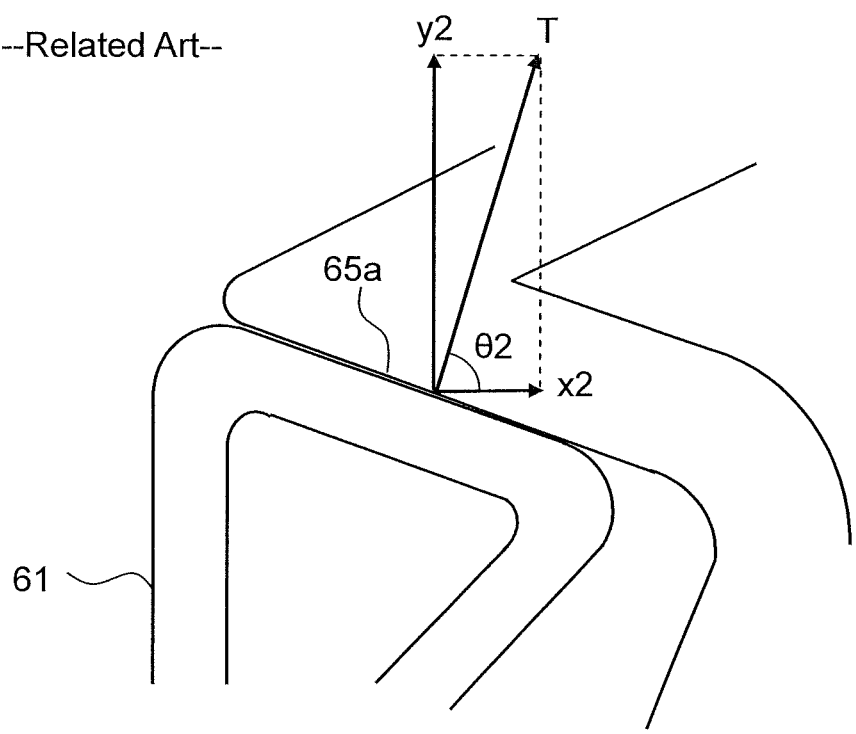
FIG. 13 is a diagram showing a load acting on a hook from the stopper in the conventional locking mechanism.

FIG. 13 is a diagram showing the load acting on the hook 60 from the stopper 61 in the conventional locking mechanism 80. As shown in FIG. 13, the load (reaction force) acting on the hook 60 from the stopper 61 is represented by the vector T[N] that is perpendicular to the first face 65a. Here, the first face 65a has a larger angle relative to the horizontal direction than the second face 65b (see FIG. 5), so the angle θ2 of the vector T relative to the horizontal direction is smaller than θ1. For example, suppose the angle θ2 of the vector T relative to the horizontal direction is 67.5°, then the component force x2=T×cos 67.5°≈0.38T[N]. Likewise, the component force y2=T×sin 67.5°≈0.92T[N].

In the locking mechanism 80 according to this embodiment, as shown in the FIG. 10, the component force x1 in the horizontal direction is 0.22T[N], so the load in the horizontal direction is smaller by (1−0.22/0.38)×100≈42.1% than in the conventional structure shown in FIG. 13. On the other hand, the component force y1 in the vertical direction y1 is 0.98T[N], so the load in the vertical direction is larger by (0.98/0.92−1)×100≈6.5% than in the conventional structure shown in FIG. 13.

That is, the locking mechanism 80 according to this embodiment and the conventional locking mechanism 80 compare as follows. Even when the load (T) acting on the hook 60 from the stopper 61 is the same, the load (x1) acting on the hook 60 in the horizontal direction in the structure according to this embodiment is smaller than the load (x2) acting on the hook 60 in the horizontal direction in the conventional structure; on the other hand, the load (y1) in the vertical direction is larger than the load (y2) in the vertical direction acting on the hook 60 in the conventional structure.

Here, the load (x1, x2) acting on the hook 60 in the horizontal direction acts as the reaction force that tends to make the hook 60 pivot in such a direction (arrow A' direction) as to disengage the hook 60 and the stopper 61 from each other. Therefore, by using the locking mechanism 80 according to this embodiment, it is possible, without increasing the biasing force (spring constant) of the tension spring 63, to increase the engagement strength between the hook 60 and the stopper 61 compared to that in the conventional structure.

When the locking mechanism 80 is unlocked, the access cover 31 is lifted up by a predetermined amount, so that the contact point between the elevated portion 61a and the engagement portion 60b moves from the second face 65b to the first face 65a. Thus the component force acting on the hook 60 in the vertical direction decreases from y1 to y2, and the component force in the horizontal direction increases from x1 to x2. Accordingly, after the access cover 31 is lifted up by a predetermined amount, it can be opened with the same force as required conventionally.

As the angle of inclination of the second face 65b to the horizontal plain becomes smaller, the angle θ1 of the load T acting on the hook 60 to the horizontal direction becomes closer to perpendicular. As a result, the component force y1 in the vertical direction becomes greater, and the engagement strength is increased, but a greater force is required to open the access cover 31. On the other hand, as the angle of inclination of the second face 65b to the horizontal plane becomes larger, while a smaller force is required to open the access cover 31, the component force y1 in the vertical direction is not great enough, resulting in reduced engagement strength. Therefore, it is preferable that the angle of inclination of the second face 65b be determined with consideration given to the engagement strength required of the locking mechanism 80 and the operability of the access cover 31.

In the above embodiment, as shown in FIG. 3, the locking mechanism 80 is arranged on either side of the frame 45 in its width direction (the left-right direction in FIG. 3); here, especially on the rear side (right side in FIG. 3) of the document conveying device 104, that is, at the side which is close to the driving portion 53 and where the vibration from the driving portion 53 is easily transmitted to the locking mechanism 80, the hook 60 and the stopper 61 are liable to disengage from each other. Thus, it is possible to arrange the locking mechanism 80 according to this embodiment on the side closer to the driving portion 53 (right side in FIG. 3) and the conventional locking mechanism 80 as shown in FIG. 11 on the side (left side in FIG. 3) farther from the driving portion 53. That is, it is preferable to arrange the locking mechanism 80 according to this embodiment at least on the side closer to the driving portion 53. That is, it is preferable to arrange the locking mechanism 80 according to this embodiment at least on the side closer to the driving portion 53.

The embodiment described above is in no way meant to limit the present disclosure, which thus allows for many modifications and variations within the spirit of the present disclosure. For example, although the above embodiment deals with the access cover 31 (cover side conveying portion 50) of the document conveying device 104 as one example of a movable unit that is locked by the locking mechanism 80, the locking mechanism 80 according to the present disclosure is applicable similarly to any other units that are removably or movably incorporated in the main body of the image forming apparatus 100, such as an exposure unit 7, a developing unit 8, a toner container 9, and a fixing unit 14.

The locking mechanism 80 according to the present disclosure is applicable not only to monochrome copiers such as the one shown in FIG. 1, but also to various types of image forming apparatuses provided with movable units such as monochrome and color printers, color copiers, and facsimile machines.

The present disclosure is applicable to locking mechanisms for movable units incorporated in image forming apparatuses. Based on the present disclosure, it is possible to provide a locking mechanism that can improve the locking ability of a hook without changing the biasing force of a biasing member acting on the hook, and to provide an image forming apparatus incorporating such a locking mechanism.

What is claimed is:

1. A locking mechanism for a movable unit, comprising:
  a hook substantially in an L shape, the hook including
    a supporting portion pivotably supported on a pivot on a unit main body and an engaging portion protruding from the supporting portion;

an engaged portion formed on the movable unit supported on, movably relative to, the unit main body, the engaging portion being engageable with the engaged portion; and a biasing member biasing the hook in a first direction to cause the engaging portion to engage with the engaged portion, the locking mechanism locking the movable unit to the unit main body, wherein the hook has a first face which is facing the engaged portion at a tip end side of the engaging portion and which is substantially perpendicular to the supporting portion and a second face extending from the first face toward a supporting portion side and inclined relative to the first face in such a direction as to recede from the pivot, and when the engaging portion and the engaged portion are in engagement, the engaged portion touches only the second face.

2. The locking mechanism according to claim 1, wherein the engaged portion includes an elevated portion touching only the second face when the engaging portion and the engaged portion are in engagement.

3. The locking mechanism according to claim 2, wherein as the movable unit moves in a direction away from the unit main body, a contact point between the elevated portion and the engaging portion moves from the second face to the first face.

4. The locking mechanism according to claim 1, wherein as the movable unit moves in such a direction as to approach the unit main body, the hook is pressed by the engaged portion and pivots in a second direction opposite to the first direction against a biasing force of the biasing member, and when the movable unit reaches a predetermined position, the hook pivots in the first direction under the biasing force of the biasing member and thereby the engaging portion engages with the engaged portion, so that the movable unit is locked to the unit main body.

5. The locking mechanism according to claim 4, wherein an inclined portion is formed on the hook at a part thereof where the hook touches the engaged portion when the movable unit moves in such a direction as to approach the unit main body, and the inclined portion converts a part of a pressure from the engaged portion into a component force acting in the second direction.

6. An image forming apparatus comprising the locking mechanism according to claim 1.

7. A sheet feeding device comprising the locking mechanism according to claim 1, wherein the movable unit is a cover-side conveying portion including an access cover and a separating and conveying portion arranged on the access cover to convey, while separating, a plurality of sheet one after another, and the unit main body is a frame-side conveying portion including a frame openably and closably supporting the access cover and a driving portion arranged on the frame to transmit a driving force to the separating and conveying portion.

8. The sheet feeding device according to claim 7, wherein the driving portion is arranged at one end side of the frame in a width direction thereof perpendicular to an opening and closing direction of the access cover, and the locking mechanism is provided at least at a driving portion side on a frame-side conveying portion.

9. An image forming apparatus comprising the sheet feeding device according to claim 7.

10. A sheet feeding device, comprising a locking mechanism for a movable unit including a hook substantially in an L shape, the hook including a supporting portion pivotably supported on a pivot on a unit main body and an engaging portion protruding from the supporting portion, an engaged portion formed on the movable unit supported on, movably relative to, the unit main body, the engaging portion being engageable with the engaged portion, and a biasing member biasing the hook in a first direction to cause the engaging portion to engage with the engaged portion, the locking mechanism locking the movable unit to the unit main body, wherein the hook has a first face facing the engaged portion at a tip end side of the engaging portion and a second face extending from the first face toward a supporting portion side and inclined relative to the first face in such a direction as to recede from the pivot, and when the engaging portion and the engaged portion are in engagement, the engaged portion touches only the second face, the movable unit is a cover-side conveying portion including an access cover and a separating and conveying portion arranged on the access cover to convey, while separating, a plurality of sheet one after another, the unit main body is a frame-side conveying portion having a frame openably and closably supporting the access cover and a driving portion arranged on the frame to transmit a driving force to the separating and conveying portion, and the driving portion is arranged at one end side of the frame in a width direction thereof perpendicular to an opening and closing direction of the access cover, and the locking mechanism is provided at least at a driving portion side on a frame-side conveying portion.

* * * * *